3,265,672
ETHYLENE, LOWER ALKYL VINYL
SULFIDE COPOLYMER
Rudolph Pariser and Dexter B. Pattison, Wilmington, Del., and Kurt L. Seligman, Beaumont, Tex., assignors to E. I. du Pont de Nemours and Company, Wilmington, Del., a corporation of Delaware
No Drawing. Filed Dec. 29, 1961, Ser. No. 163,070
5 Claims. (Cl. 260—79.7)

This invention relates to novel elastomeric copolymers and more particularly to elastomeric copolymers of ethylene, an alkyl vinyl sulfide, and, optionally, a minor proportion of another monomer such as acrylic acid.

It is an object of the present invention to provide a novel elastomeric copolymer. A further object is to provide an elastomeric ethylene-alkyl vinyl sulfide copolymer. A still further object is to provide a modified ethylene-alkyl vinyl sulfide elastomeric copolymer containing side chains bearing cross-linking sites. Still another object is to provide a process for the preparation of these novel elastomeric copolymers. Other objects will appear hereinafter.

These and other objects of this invention are accomplished by providing the novel elastomeric copolymers which contain from about 25 to 70 percent by weight of monomer units of at least one lower alkyl vinyl sulfide, from about 0 to 10 percent by weight of monomer units of a compound of the formula $CH_2=CRR'$ wherein R and R' are as defined hereinafter, with the remainder of said copolymer (from about 20 to 75 percent by weight) being ethylene monomer units. The novel copolymers of this invention are quite elastomeric in nature and therefore have a number of varied uses. By the term "elastomer" or "elastomeric" is meant that the copolymers are rubber-like substances, that is, they are materials which have the ability to resist deformation and which recover quickly the original shape and size when the deforming forces are removed.

As indicated above, one of the components present in the novel copolymers of the present invention is a lower alkyl vinyl sulfiide. It is preferred that these sulfides contain from one to 4 carbon atoms and representative examples of such materials include methyl vinyl sulfide, which is preferred, ethyl vinyl sulfide and tertiary butyl vinyl sulfide. Mixtures of these vinyl sulfides may be employed.

The optional component which may be present in the novel copolymers of the present invention corresponds to the formula $CH_2=CRR'$. In this formula, R may be hydrogen or a methyl radical and R' may be a radical selected from the group consisting of

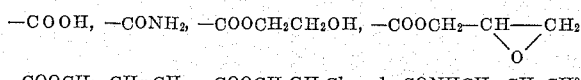

Representative examples of monomers which may be used in conjunction with ethylene and the lower alkyl vinyl sulfide in the novel copolymers of the present invention include acrylic acid, methacrylic acid, acrylamide, methacrylamide, β-hydroxyethyl acrylate, β-hydroxyethyl methacrylate, glycidyl acrylate, glycidyl methacrylate, allyl acrylate, allyl methacrylate, β-chloroethyl acrylate, β-chloroethyl methacrylate, N-allyl acrylamide, and N-allyl methacrylamide.

In order that the novel copolymers of the present invention possess the desired elastomeric properties, it is necessary that the various monomer units be present in the copolymer in certain proportions. Thus, the copolymers should contain from about 25 to 70 percent by weight of monomer units of the lower alkyl vinyl sulfide and no more than about 10 percent by weight of monomer units of the optional component. For copolymers containing only ethylene and alkyl vinyl sulfide monomer units, the value of the molar ratio of ethylene and alkyl vinyl sulfide monomer units in the copolymer has a definite bearing on the nature of the product. Thus, when between about 2 and 5 ethylene monomer units are present in the copolymers for every alkyl vinyl sulfide monomer unit (corresponding to about 32 to 66 percent by weight ethylene monomer units and 68 to 34 percent by weight alkyl vinyl sulfide monomer units, depending on the particular sulfide monomer), the copolymer is an elastomer. When more than about 5 ethylene monomer units are present for every alkyl vinyl sulfide monomer unit, the copolymer becomes less elastomeric and as the value is increased the resulting copolymer displays no rubbery properties whatsoever. With ethylene and methyl vinyl sulfide, a preferred ratio is about 43 to 66 percent by weight ethylene monomer units and 57 to 34 percent by weight sulfide monomer units.

The optional material which may be used in preparing the novel copolymers of the present invention is particularly useful when a sulfur-curable copolymer is desired. It is particularly preferred to employ an amount of the optional material so as to provide at least about 0.03 gram mole of this material per 100 grams of copolymer, that is, about 3 percent or more by weight. For purposes of the present invention, in order to provide a sulfur-curable copolymer, the preferred optional unsaturated monomers to be used are allyl acrylate and allyl methacrylate. In addition to providing sites for sulfur curing, the incorporation of amounts of not more than about 10 percent by weight of unsaturated monomer units of the formula $CH_2=CRR'$ provides additional advantages. Thus, it has been found, for example, that the use of a small amount of allyl acrylate when preparing these copolymers raises the molecular weight of the copolymer obtained so that the copolymer can be handled well on a rubber roll mill. Even an amount as small as 0.5 percent allyl acrylate, based on the weight of alkyl vinyl sulfide charged, is sufficient to give a millable but tacky polymer, whereas an elastomer made using 1 percent allyl acrylate based on the alkyl vinyl sulfide charged is a much tougher elastomer with little tack. A representative sulfur-curable copolymer contained 43 percent methyl vinyl sulfide, 6 percent allyl acrylate, and 51 percent of ethylene monomer units on a weight basis, and displayed an inherent viscosity (0.1 percent by weight solution in xylene at 30° C.) of 0.82. A preferred three-component, sulfur-curable copolymer is one containing about 33 to 66 percent by weight ethylene monomer units, 24 to 57 percent by weight methyl vinyl sulfide monomer units and 1 to 10 percent by weight allyl acrylate monomer units.

The novel copolymers of the present invention can be prepared by contacting ethylene, at least one alkyl vinyl sulfide, and optionally, at least one monomer $CH_2=CRR'$, optionally in an inert liquid medium, with free radical catalysts at temperatures between about 20 and 200° C. (50 to 100° C. being preferred) at superamospheric pressure in the absence of oxygen. Those skilled in the art may select any of the dialkyl peroxides, diacyl peroxides, substituted azoacetonitriles, tertiary alkyl hydroperoxides, and the like customarily used for initiating free radical polymerization. Since the half-life for the thermal decomposition of each of these catalysts is a function of temperature, those skilled in the art will select a reaction temperature at which the catalyst is known to decompose at a convenient rate. The following list of catalysts is intended to be merely illustrative (the temperature at which the half-life of the catalyst is 1 hour is given inside the parentheses): trichloroacetyl peroxide (10° C.); heptafluorobutyryl peroxide (35° C.); 1,1'-azobis-1,3,3-trimethylvaleronitrile (45° C.); 1,1'-azobis(1,3-dimethylvaleronitrile) (68° C.); lauroyl peroxide (79° C.); 2,2'-azobis(2-methylpropionitrile) (82° C.); acetyl peroxide (89° C.); benzoyl peroxide (95° C.); azodicyclohexane carbonitrile (105° C.); tertiary butyl peracetate (123° C.); dicumyl peroxide (138° C.). Water-soluble catalysts such as ammonium persulfate, potassium persulfate, ditertiary butyl peroxy dicarbamate, and potassium azodisulfonate can be used. Particularly desirable catalysts include: 1,1'-azodicyclohexane carbonitrile; 2,2'-azobis(2-methylpropionitrile); 2,2' - azobis(2,4-dimethylvaleronitrile). Additional free radical catalysts are listed in the November 1960 issue of Petroleum Refiner on pages 186 to 189. When desired, mixtures of free radical catalysts can be used. Ultraviolet radiation can also be employed.

In general, about 0.01 to 2 weight percent of catalyst is used based on the total weight of polymerizable monomers present. A preferred concentration is about 0.05 to about 0.2 weight percent. One skilled in the art can readily determine by empirical means a catalyst concentration which wil give optimum results.

A bulk process may be used for the copolymerization; however, free radical reactions are usually carried out in the presence of an inert liquid medium for convenience of agitation; this medium can, if desired, be a solvent for the copolymer. By "inert liquid medium" is meant any conventional diluent for a free radical reaction wherein the diluent does not interfere with the desired course of the reaction. The preferred inert diluents for ethylene/alkyl vinyl sulfide copolymerizations are water, tertiary butyl alcohol, and benzene. Those skilled in the art will readily understand that when monomers of the formula $CH_2=CRR'$ are present, the diluent must not react with the functional group in R'; thus alcohols are not used as a reaction solvent when R' is terminated by an epoxy group and aqueous alkali solutions are avoided when R' is carboxyl-terminated. Those skilled in the art can readily determine the proportion of monomer to diluent convenient for carrying out the reaction. By way of illustration, mixtures containing about 4 to 100 grams of tertiary butyl alcohol or 120 to 157 grams of water for each 100 grams of monomers have been very satisfactory. When desired, part or all of the diluent can be replaced by one or more of the monomers.

The free radcial catalytic reaction is carried out at superatmospheric pressure. Those skilled in the art can readily determine the pressure best suited for operation at a particular temperature for a particular free radical catalyst. Satisfactory results have been obtained at pressures ranging from about 990 to 3200 atmospheres.

In order to make a copolymer having the proper proportion of ethylene and alkyl vinyl sulfide monomer units, about 7.9 to 18.5 moles of ethylene are supplied for each mole of alkyl vinyl sulfide; in the case of methyl vinyl sulfide, one thus uses about 3 to 7 parts (by weight) of ethylene for every part (by weight) of the sulfide. The above-described monomers having the formula $$CH_2=CRR'$$

are very reactive. Therefore, when a copolymer containing these monomer units is desired, the entire portion of this monomer is supplied at the start of the polymerization. A sufficient amount of ethylene and alkyl vinyl sulfide should be present so that the initial pressure at the reaction temperature is at least 990 atmospheres. It is sometimes more convenient to supply 10 to 50 percent of the total $CH_2=CRR'$ monomer at the start and to introduce the remainder intermittently or continually during the polymerization period. Conversions up to 50 percent based on the alkyl vinyl sulfide, are satisfactory; conversions below 40 percent are preferred.

The reaction is generally carried out in pressure vessels such as autoclaves, or shaker tubes. The reaction vessel lining can be any material (such as silver, stainless steel or nickel) which does not affect the desired course of the reaction.

The copolymers can be made by the following general procedure: An evacuated stainless steel shaker tube, purged with nitrogen to remove atmospheric oxygen, is charged at room temperature with a solution containing the catalyst (for example, azodicyclohexane carbonitrile) and the alkyl vinyl sulfide. After being subsequently cooled for about 3 to 10 minutes in Dry Ice, it is placed in a shaking device behind a barricade and charged with ethylene. It is then heated to a reaction temperature suitable for the free radical catalyst employed; for example 95° C. when azodicyclohexane carbonitrile is used. The shaker tube is then agitated at the reaction temperature for a time long enough to consume up to about 50 percent of the alkyl vinyl sulfide; ethylene may be introduced from time to time to maintain a constant pressure. Reaction times ranging from 1½ to 3 houls at 95 to 100° C. or 6 to 12 hours at 55 to 77° C. have proved satisfactory. At the end of the reaction period, the tube is cooled to room temperature and excess ethylene is vented off. The elastomeric copolymer is precipitated by addition of a non-solvent. When an organic diluent is used, it is often convenient to take off part of the solvent before adding the non-solvent to the copolymer solution. After collection by conventional methods such as filtration or centrifugation, the precipitated copolymer is washed with non-solvent and dried in a vacuum oven at about 50° C. The copolymer can also be isolated by complete evaporation of the solvent, or by conventional drum-drying or mill drying techniques.

The copolymers of the present invention can be prepared by a continuous process at superamospheric pressure. Thus, monomers and catalyst, and optionally inert solvent, can be introluced into a polymerization zone at such a rate as to provide a residence time sufficient to maintain the proper composition and to build up the desired concentration of copolymer in the polymerization medium. The heretofore described conditions can be observed; thus about 3 to 7 parts of ethylene are supplied for every part by weight of alkyl vinyl sulfide; about 0.02 to 1.0 part of catalyst is introduced for every 100 parts by weight of total monomers; the conversion can range up to about 50 percent based on the alkyl vinyl sulfide charged; temperatures of 20 to 200° C. and pressures of 1000 to 3000 atmospheres are suitable. Continuous or batch procedures can be used to recover the copolymer product from the reaction mixture which continually overflows from the polymerization zone.

The novel copolymers of this invention may be cured by a wide variety of free radical curing procedures to form highly useful elastomers. In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50° to 175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alpha-dimethylbenzyl)peroxide, dibenzoyl peroxide, di-tert-butyl peroxide, cumene hydroperoxide, methyl ethyl ketone peroxide, tert-butyl perbenzoate and di-N-methyl-tert-butyl percarbamate. Bis(alpha,alpha-dimethylbenzyl) peroxide (often called dicumyl peroxide) and 2,5-bis(tert-butyl peroxy)-2,5-dimethyl hexane are particularly preferred. About 1 to 3 parts by weight is used for every 100 parts by weight of the elastomeric copolymer. The compounded stock is then cured at about 150° C. for about 30 to 60 minutes.

In addition to the free radical generator, a free radical acceptor may be present such as N-substituted maleimide, an N,N'-substituted bismaleimide, and N,N'-substituted bisacrylamide, a cyclic triacryloylhexahydrotriazine, or mixtures thereof. The quantity of free radical acceptor may range from about 0.5 percent to 6 percent by weight of the copolymer. The weight of the free radical acceptor may be less, equal to, or more than the weight of the free radical generator. Representative maleimides include compounds such as N-methyl maleimide, N-phenyl maleimide and N-pyrenyl maleimide.

Representative bismaleimides include N,N'-ethylene bismaleimide, N,N'-phenylene bismaleimide and N,N'-pyrenylene bismaleimide. Representative bisacrylaimides include methylene bisacrylamide and phenylene bisacrylamide.

A wide variety of compounding agents may be incorporated with these elastomeric copolymers at the time they are cured in order to improve various properties. Thus, they may be loaded with carbon black in order to increase the tensile strength. Other compounding agents include sulfur, N,4-dinitroso-N-methyl aniline, titanium dioxide and silica.

The modified ethylene-alkyl vinyl sulfide copolymers wherein the compound $CH_2=CRR'$ has been used, possess reactive pendant groups ($R'$ as defined above) which permit other modes of curing, when desired. Representative examples of reactive groups and curing agents with which they would be reacted are as follows:

| Curing Agent | Reactive Group |
| --- | --- |
| Organic polyisocyanate | Hydroxyl. |
| Diepoxide | Hydroxyl, Carboxyl. |
| Sulfur | Allyl. |
| Magnesium Oxide | β-Chloroethoxy. |
| Polyamine | Epoxy. |
| Formaldehyde | Amido. |

The copolymers of this invention have many varied uses. They may be employed in the preparation of tires, inner tubes, belts, hose and tubing, wire and cable jackets, footwear, sponges, coated fabrics, and a wide variety of coated or molded articles. The cured copolymers are characterized by good oil resistance and good thermal stability. The uncured but compounded copolymers can be stored for lengthy periods before shaping and vulcanizing.

The following examples will better illustrate the nature of the present invention; however, the invention is not intended to be limited to these examples. Parts are by weight unless otherwise indicated.

*Example 1*

An evacuated nitrogen-flushed 400-milliliter stainless steel shaker tube was charged at room temperature (about 25° C.) with methyl vinyl sulfide (16 grams), tertiary butanol (10 grams), 1,1'-azodicyclohexane carbonitrile (0.10 gram). The shaker tube was cooled in a Dry Ice mixture, put in a shaking device behind a barricade, and charged with ethylene (229 grams). Rapid agitation was begun and the tube was heated for 1.5 hours at 95° C. during which period the pressure fell from 995 atmospheres to a final value of 950 atmospheres. The heat was shut off and the shaker tube was allowed to cool to room temperature (about 25° C.) while being agitated. After gases had been vented off, the shaker tube was opened and its contents poured into a bottle containing 5 grams of an antioxidant solution [made by dissolving para-t-butyl catechol (10 grams) and N-phenyl-beta-naphthylamine (4 grams) in benzene (880 grams)]. Isopropanol (40 grams) was added and the solution obtained was allowed to evaporate overnight. The copolymer which had separated was filtered, washed twice with 20-gram portions of isopropanol, and dried in a vacuum oven at 70° C. for 4 hours. The elastomer obtained weighed 3.7 grams, exhibited an inherent viscosity of 0.26 (0.1% solution in m-xylene at 30° C.), and contained 32 percent by weight methyl vinyl sulfide monomer units and 68 percent by weight ethylene monomer units (molar ratio of ethylene:methyl vinyl sulfide monomer units=5.7).

*Example 2*

In accordance with the procedure of Example 1, a 200-milliliter shaker tube was filled with methyl vinyl sulfide (28 grams), tertiary butanol (30 grams), 1,1'-azodicyclohexane carbonitrile (0.05 gram), and ethylene (92 grams). The shaker tube was heated while rapidly shaken at 95° C. for a period of 3 hours during which the pressure fell from an initial value of 2700 atmospheres to 2450 atmospheres. After being cooled to room temperature, the tube was opened and its contents (along with a subsequent acetone rinse) were added to a bottle containing 1 gram of the antioxidant solution described in Example 1. Addition of isopropanol (100 grams) to the above-described mixture precipitated the copolymer. After decantation of the liquid, the copolymer was washed with two 20-gram portions of isopropanol and dried overnight in a 40° C. vacuum oven. The white sticky elastomer obtained weighed 8.4 grams, exhibited an inherent viscosity of 0.18, and contained (by weight) 45 percent ethylene monomer units and 55 percent methyl vinyl sulfide monomer units (molar ratio of ethylene:methyl vinyl sulfide=2.14).

*Example 3*

In accordance with the procedure of Example 1, a 200-milliliter shaker tube was filled with methyl vinyl sulfide (20 grams), tertiary butanol (30 grams), 2,2'-azobis(2-methylpropionitrile) (0.10 gram), and ethylene (98 grams). After the shaker tube had been heated to 60° C., the pressure was 2100 atmospheres. More ethylene was added to raise the pressure to 3000 atmospheres. The tube was then heated, while rapidly agitated, at 60° C. for 8 hours. During this time the pressure fell gradually to 2790 atmospheres. After being cooled, the tube was emptied and the copolymer was isolated by a procedure similar to that described in Example 2 above. The transparent elastomer obtained (yield: 4.2 grams) exhibited an inherent viscosity of 0.25 and contained (by weight) 46 percent ethylene monomer units and 54 percent methyl vinyl sulfide monomer units (molar ratio of ethylene:methyl vinyl sulfide=2.30).

*Example 4*

In accordance with the method of Example 1 above, a 200-milliliter stainless steel shaker tube was charged with methyl vinyl sulfide (18 grams), phenothiazine (0.005 gram), tertiary butanol (30 grams), 2,2'-azobis(2-methylpropionitrile) (0.10 gram), and ethylene (102 grams). Rapid agitation was begun and the shaker tube was heated to 60° C. A small amount of gas was vented to reduce the pressure from 3200 atmospheres to 2900 atmospheres. The shaker tube was then heated, while agitated, for 2 hours at 60 to 70° C. and for 7 hours at 70° C. The pressure fell from 2940 to 2560 atmospheres during this period. The copolymer, isolated by a procedure similar to that described in Example 2, was a sticky elastomer (yield: 13.4 grams) exhibiting an inherent viscosity of 0.43 and containing 54 percent ethylene monomer units and 46 percent methyl vinyl sulfide monomer units (molar ratio of ethylene monomer units to methyl vinyl sulfide monomer units=3.1).

*Example 5*

In accordance with the procedure of Example 1 above, a 200-milliliter stainless steel shaker tube was charged at room temperature with sodium sulfite (2 grams), deoxygenated distilled water (100 grams), phenothiazine (0.005 gram), 2,2'-azobis(2-methylpropionitrile) (0.15 gram), and methyl vinyl sulfide (12 grams). While rapidly shaken, the tube was heated to 65° C. and sufficient ethylene (71 grams total) was added at intervals so that the pressure was maintained at 2600 to 2800 atmospheres. After the tube had been shaken for 4 hours at 65° C., it was cooled to room temperature and gases were vented. The tube was opened, unloaded, and rinsed with water (50 grams). An equal volume of methanol was added to the combined reaction mixture and rinsings to precipitate the copolymer completely. After the supernatant liquid had been decanted, the copolymer was washed in turn with water and methanol, and finally dried overnight in a vacuum oven at 60° C. to give a white sticky rubber (2.4 grams) exhibiting an inherent viscosity of 0.33 and containing (by weight) 53 percent ethylene monomer units and 47 percent methyl vinyl sulfide monomer units (molar ratio of ethylene monomer units to methyl vinyl sulfide monomer units 2.9).

*Example 6*

In accordance with the procedure of Example 1 above, a 200-milliliter stainless steel shaker tube was charged at room temperature with sodium sulfite (2 grams), deaerated distilled water (100 grams), phenothiazine (0.005 gram), 2,2'-azobis(isobutyronitrile) (0.15 gram), and methyl vinyl sulfide (10 grams). The shaker tube was heated while rapidly agitated and enough ethylene (65 grams in all) was added at intervals to keep the pressure at 2550 to 2750 atmospheres during a period of 10 hours at 60° C. The copolymer, isolated by the method of Example 5, was a sticky white elastomer (yield: 4.9 grams) exhibiting an inherent viscosity of 0.44 and containing (by weight) 58 percent ethylene monomer units and 42 percent methyl vinyl sulfide monomer units (molar ratio of ethylene monomer units to methyl vinyl sulfide monomer units 3.7).

*Example 7*

In accordance with the procedure of Example 1, a 200-milliliter stainless steel shaker tube was charged with distilled, deaerated water (120 grams), sodium sulfite (0.5 gram), potassium dihydrogen sulfite ($KH_2PO_4$) (1.2 grams), potassium monohydrogen phosphate ($K_2HPO_4$)

(0.2 gram), 2,2'-azobis(2-methylpropionitrile) (0.15 gram), and methyl vinyl sulfide (10 grams). While rapidly shaken, the tube was heated for 12 hours at 60 to 65° C. Enough ethylene was added at intervals to maintain a pressure of 2600–2800 atmospheres during this period. The copolymer isolation procedure of Example 5 was used except that isopropanol was substituted for methanol during the copolymer washing. The copolymer was obtained as a white sticky elastomer (yield 6.5 grams) exhibiting an inherent viscosity of 0.33 and containing (by weight) 54 percent ethylene monomer units and 46 percent methyl vinyl sulfide monomer units (molar ratio of ethylene monomer units to methyl vinyl sulfide monomer units=3.1).

*Example 8*

In accordance with the method of Example 1, a 200-milliliter stainless steel shaker tube was charged with distilled, deaerated water (120 grams), sodium sulfite (0.5 gram), potassium dihydrogen phosphate (0.5 gram), potassium monohydrogen phosphate (1.2 grams), 2,2'-azobis(2-methylpropionitrile) (0.15 gram), and methyl vinyl sulfide (10 grams). The tube was heated while rapidly shaken for 7 hours at 65° C.; ethylene (62 grams in all) was injected at intervals to maintain the pressure at 2950–2750 atmospheres. The elastomer (yield: 8.1 grams) isolated by a procedure similar to that employed in Example 7, exhibited an inherent viscosity of 0.41 and contained (by weight) 57 percent ethylene monomer units and 43 percent methyl vinyl sulfide monomer units (molar ratio of ethylene monomer units to methyl vinyl sulfide monomer units=3.5).

*Example 9*

In accordance with the procedure of Example 1, a 200-milliliter stainless steel shaker tube was charged with distilled, deaerated water (120 grams), sodium bisulfite (0.5 gram), boric acid (0.6 gram), 2,2'-azobis(2-methylpropionitrile) (0.15 gram), and methyl vinyl sulfide (10 grams). The tube was heated while rapidly shaken for 6 hours at 60° C.; ethylene (57 grams in all) was injected at intervals to maintain a pressure at 2700–2800 atmospheres. The copolymer, isolated by the procedure similar to that described in Example 7, above, was a sticky elastomer weighing 2.3 grams, exhibiting an inherent viscosity of 0.33, and containing (by weight) 50 percent ethylene monomer units and 50 percent methyl vinyl sulfide monomer units (molar ratio of ethylene monomer units to methyl vinyl sulfide monomer units= 2.7).

*Example 10*

In accordance with the procedure of Example 1 above, a 200-milliliter stainless steel shaker tube was charged with tertiary butanol (30 grams), 2,2'-azobis(2,4-dimethylvaleronitrile) (0.10 gram), methyl vinyl sulfide (16 grams), and allyl acrylate (0.08 gram). The tube was thereafter heated while rapidly shaken at 55° C. for 12 hours. Enough ethylene (105 grams in all) was added to maintain a pressure of 2700–2900 atmospheres during this time. The copolymer, isolated by a procedure similar to that described in Example 2 above, was dried in a vacuum oven at 60° C. for a period of 4 hours. The white, somewhat sticky elastomer obtained (yield: 9.9 grams) exhibited an inherent viscosity of 0.46 and contained (by weight) 50 percent methyl vinyl sulfide monomer units and 0.65 to 0.8 percent (by weight) of allyl acrylate monomer units (molar ratio of ethylene monomer units to methyl vinyl sulfide monomer units was about 2.7).

*Example 11*

In accordance with the procedure of Example 1 above, a 200-milliliter stainless steel shaker tube was charged with benzene (30 grams), 2,2'-azobis(2,4-dimethylvaleronitrile) (0.10 gram), methyl vinyl sulfide (16 grams), and allyl acrylate (0.16 gram). The tube was rapidly shaken at 60° C. for 12 hours; ethylene (114 grams in all) was injected at intervals in an amount sufficient to maintain a pressure of 2700–2900 atmospheres. The elastomeric copolymer, isolated by the procedure described in Example 7 above, weighed 12 grams, exhibited an inherent viscosity of 0.51 and contained (by weight) 39 percent methyl vinyl sulfide monomer units, about 60 percent ethylene monomer units, and 0.7 to 1.4 percent allyl acrylate monomer units (molar ratio of ethylene monomer units to methyl vinyl sulfide monomer units approximately 4.0).

*Example 12*

In accordance with the procedure of Example 1 above, a 200-milliliter stainless steel shaker tube was charged with tertiary butanol (30 grams), 2,2'-azobis(2,4-dimethylvaleronitrile) (0.10 gram), methyl vinyl sulfide (16 grams), and allyl acrylate (0.48 gram). The tube was then rapidly shaken for 7 hours at 55° C.; sufficient ethylene (104 grams) was injected at intervals to maintain 2700–2900 atmospheres pressure. The copolymer product, isolated by procedure of Example 7, was an elastomer weighing 7 grams. It processed well on a rubber roll mill, exhibited an inherent viscosity of 0.82, and contained 43 percent (by weight) methyl vinyl sulfide monomer units and 5.5 to 6.9 percent (by weight) allyl acrylate monomer units.

Example 13

In accordance with the procedure of Example 1, a 200-milliliter stainless steel shaker tube was charged with tertiary butanol (30 grams), 2,2'-azobis(2,4-dimethyl-valeronitrile) (0.10 gram), methyl vinyl sulfide (15 grams), and allyl acrylate (0.45 gram). While rapidly shaken, the tube was heated for 10 hours at 56° C. Sufficient ethylene was injected at intervals to maintain a pressure of 2700–2900 atmospheres. The copolymer, obtained in accordance with the procedure of Example 7, weighed 10.6 grams and contained 33 percent methyl vinyl sulfide monomer units (by weight) and 3.4 to 4.2 percent (by weight) allyl acrylate monomer units.

The copolymer prepared above was compounded on a cold rubber roll mill according to the following recipe:

| | Grams |
|---|---|
| Copolymer | 10 |
| Antioxidant [1] | 0.1 |
| High abrasion furnace black | 5 |
| Sulfur | 0.02 |
| Peroxide mixture [2] | 0.8 |

[1] 2,2'-methylenebis(6-tert-butyl-4-methyl phenol).
[2] 40% dicumyl peroxide, 60% calcium carbonate.

After the stock prepared above had been cured for 1 hour at 160° C., the resulting vulcanizate exhibited a tensile strength (at 25° C.) of 2000 lb./sq. in. and an elongation at the break of 380%. After the copolymer had been aged for 14 days in an air oven at 121° C., the tensile strength was 1900 lb./sq. in. and the elongation at break was 190%. These data show that the rubber had excellent stability under high temperature oxidation conditions. The brittle point of the unaged elastomer was −65° C.

Example 14

The procedure of Example 13 was repeated except that the temperature used in preparing the copolymer was raised to 60° C., the time was shortened to 9 hours, and the pressure was maintained at 2800 atmospheres. The copolymer obtained (yield: 12.6 grams) exhibited an inherent viscosity of 0.71 and contained (by weight) 25 percent methyl vinyl sulfide monomer units and 2.9 to 3.6 percent (by weight) allyl acrylate monomer units.

The copolymer, cured by the procedure of Example 13 above, gave vulcanizates exhibiting a tensile strength (at 25° C.) of 1950 lb./sq. in., an elongation at the break of 300%, a Shore A hardness of 68, a Yerzley resilience of 59%, and a compression set (22 hrs./70° C.) of 44%.

Example 15

In accordance with the procedure of Example 1 above, a 200-milliliter stainless steel shaker tube was charged with benzene (30 grams), 2,2'-azobis(2,4-dimethylvaleronitrile) (0.10 gram), methyl vinyl sulfide (18 grams), and allyl acrylate (0.54 gram). The tube was heated while rapidly shaken for 10 hours at 55° C.; a total of 86 grams of ethylene was injected in intervals during this period to maintain a pressure of 2800–3000 atmospheres. The copolymer, obtained by the method of Example 7, was a slightly sticky rubber weighing 8.1 grams, exhibiting an inherent viscosity of 0.58, and containing by weight 45 percent methyl vinyl sufide monomer units and 5.3 to 6.7 percent (by weight) allyl acrylate monomer units.

Vulcanizates made by curing the copolymer by the procedure of Example 13 above, exhibited at 25° C. a tensile strength of 800 lb./sq. in. and an elongation at the break of 310%. After the vulcanizate had been aged for 14 days in a circulating air oven at 121° C., it exhibited a tensile strength of 1400 lb./sq. in. and an elongation at the break of 130%. The brittle point of the unaged elastomer was −40° C.

Example 16

The reaction conditions of Example 1 were used except that the amount of methyl vinyl sulfide was increased to 20 grams and 0.60 gram of allyl acrylate was employed. The copolymer product was a slightly sticky elastomer weighing 7.4 grams, exhibiting an inherent viscosity of 0.55, and containing (by weight) 50 percent methyl vinyl sulfide monomer units and 6.5 to 8.1 percent (by weight) allyl acrylate monomer units.

Vulcanizates, made by compounding and curing this copolymer according to the procedure of Example 13 above, exhibited the following properties at 25° C.: tensile strength, 1250 lb./sq. in.; elongation at the break, 320%; Shore A hardness, 49; Yerzley resilience, 26%; compression set (22 hrs./70° C.), 9%; brittle point, −53° C.

Example 17

In accordance with the procedure of Example 1 above, a 200-milliliter stainless steel shaker tube was charged with tertiary butanol (30 grams), 2,2'-azobis(2,4-dimethylvaleronitrile) (0.10 gram), ethyl vinyl sulfide (19 grams), and allyl acrylate (0.48 gram). The tube was thereafter heated while rapidly shaken at 58° C. for 10 hours, with ethylene injected at intervals as necessary to maintain a pressure of 2800–3000 atmospheres. The copolymer, isolated by a procedure similar to that of Example 2 above, was dried in a vacuum oven at 50° C. overnight. The white, somewhat sticky elastomer obtained weighed 12.2 grams and had an inherent viscosity in xylene (0.1 percent by weight solution) at 30° C. of 0.84. The elastomer contained 52 percent (by weight) ethyl vinyl sulfide monomer units and 3.1 to 3.9 percent allyl acrylate monomer units.

Example 18

In accordance with the procedure of Example 1 above, a 200-milliliter stainless steel shaker tube was charged with tertiary butanol (30 grams), 2,2'-azobis(2,4-dimethylvaleronitrile) (0.10 gram), tertiary butyl vinyl sulfide (25 grams), and allyl acrylate (0.48 gram). The tube was heated while rapidly shaken at 58° C. for 10 hours, with ethylene injected at intervals to maintain a pressure of 2800–3000 atmospheres. The copolymer, isolated by a procedure similar to that of Example 2 above, was dried in a vacuum oven at 60° C. overnight. The white very sticky elastomer weighed 10.1 grams and had an inherent viscosity in xylene (0.1 percent by weight solution) at 30° C. of 0.36. The elastomer contained (by weight) 69 percent tertiary butyl vinyl sulfide monomer units and 3.8 to 4.8 percent (by weight) allyl acrylate monomer units.

As many widely different embodiments of this invention may be made without departing from the spirit and scope thereof, it is to be understood that this invention is not limited to the specific embodiments thereof except as defined in the appended claims.

What is claimed is:

1. An elastomeric copolymer containing from about 25 to 70 percent by weight of monomer units of at least one lower alkyl vinyl sulfide, from about 0 to 10 percent by weight of monomer units of a compound of the formula

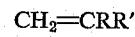

wherein R is selected from the group consisting of hydrogen and a methyl radical and R' is a radical selected from the group consisting of

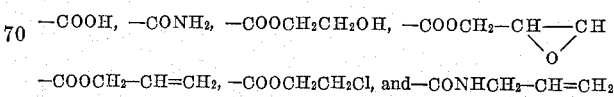

and from about 20 to 75 percent by weight of ethylene monomer units.

2. A copolymer of claim 1 wherein the lower alkyl vinyl sulfide is methyl vinyl sulfide.

3. A copolymer of claim 1 wherein the compound of the formula $CH_2=CRR'$ is allyl acrylate.

4. An elastomeric copolymer containing about 34 to 57 percent by weight methyl vinyl sulfide monomer units and about 43 to 66 percent by weight ethylene monomer units.

5. An elastomeric copolymer containing about 24 to 57 percent by weight methyl vinyl sulfide monomer units, about 1 to 10 percent by weight allyl acrylate monomer units and about 33 to 66 percent by weight ethylene.

References Cited by the Examiner
UNITED STATES PATENTS

| | | | |
|---|---|---|---|
| 2,377,753 | 6/1945 | Brubaker | 260—79.7 |
| 2,395,327 | 2/1946 | Hanford | 260—79.7 |
| 2,405,962 | 8/1946 | Larson et al. | 260—79.7 |

MURRAY TILLMAN, *Primary Examiner.*

LEON J. BERCOVITZ, *Examiner.*

E. J. TROJNAR, P. LIEBERMAN,
*Assistant Examiners.*